United States Patent
Jung et al.

(10) Patent No.: US 9,298,032 B2
(45) Date of Patent: Mar. 29, 2016

(54) LIQUID CRYSTAL DISPLAY

(71) Applicant: Samsung Display Co., Ltd., Yongin, Gyeonggi-Do (KR)

(72) Inventors: Hyung Gi Jung, Cheonan-si (KR); Jae Hwa Park, Gumi-si (KR); Ki Pyo Hong, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 95 days.

(21) Appl. No.: 14/327,859

(22) Filed: Jul. 10, 2014

(65) Prior Publication Data

US 2015/0077678 A1 Mar. 19, 2015

(30) Foreign Application Priority Data

Sep. 16, 2013 (KR) .................. 10-2013-0111085

(51) Int. Cl.
*G02F 1/136* (2006.01)
*G02F 1/1335* (2006.01)
*G02F 1/1337* (2006.01)
*G02F 1/1362* (2006.01)

(52) U.S. Cl.
CPC .... *G02F 1/133512* (2013.01); *G02F 1/136209* (2013.01); *G02F 2001/136218* (2013.01); *G02F 2001/136222* (2013.01)

(58) Field of Classification Search
CPC ............ G02F 1/1368; G02F 1/136227; G02F 1/136286; G02F 1/133514; G02F 1/133512; G02F 1/133216; G02F 1/1393; G02F 1/133707; H01L 27/1214; H01L 27/12
USPC ........................................... 349/43, 106, 130
See application file for complete search history.

(56) References Cited

U.S. PATENT DOCUMENTS

| | | | |
|---|---|---|---|
| 2011/0019140 A1 | 1/2011 | Kim et al. | |
| 2011/0122357 A1 | 5/2011 | Chang et al. | |
| 2012/0033165 A1 | 2/2012 | Lee et al. | |
| 2012/0038867 A1 | 2/2012 | Kwon et al. | |
| 2013/0077031 A1 | 3/2013 | Kim et al. | |
| 2014/0267962 A1* | 9/2014 | Jung | G02F 1/134363 349/33 |
| 2015/0185555 A1* | 7/2015 | Kim | G02F 1/133528 349/96 |

FOREIGN PATENT DOCUMENTS

| | | |
|---|---|---|
| JP | 2005-070442 | 3/2005 |
| JP | 2011-123323 | 6/2011 |
| KR | 1020070076740 A | 7/2007 |
| KR | 1020070089352 A | 8/2007 |

(Continued)

*Primary Examiner* — Mike Qi
(74) *Attorney, Agent, or Firm* — Innovation Counsel LLP

(57) ABSTRACT

Disclosed is a liquid crystal display including: a first substrate; a gate line disposed on the first substrate; a data line disposed on the gate line; and a thin film transistor connected to the gate line and the data line. A plurality of color filters is disposed on the thin film transistor and the data line. A capping layer is disposed on the plurality of color filters. A shielding electrode is disposed on the capping layer. An insulating layer is disposed on the capping layer and includes a first opening extending to a part of the shielding electrode. A light blocking member is disposed on the insulating layer and the shielding electrode. The shielding electrode is disposed in a part corresponding to the data line. Adjacent color filters among the plurality of color filters overlap with each other in the part corresponding to the data line. The first opening is disposed in a part corresponding to the region where the adjacent color filters overlap with each other.

20 Claims, 8 Drawing Sheets

(56) References Cited

FOREIGN PATENT DOCUMENTS

| KR | 1020080034545 A | 4/2008 |
| KR | 1020120060996 A | 6/2012 |
| KR | 1020120074967 A | 7/2012 |
| KR | 1020120104720 A | 9/2012 |
| KR | 1020120120761 A | 11/2012 |
| KR | 1020130034700 A | 4/2013 |

* cited by examiner

LIQUID CRYSTAL DISPLAY

CROSS-REFERENCE TO RELATED APPLICATION

This application claims priority to and the benefit of Korean Patent Application No. 10-2013-0111085 filed in the Korean Intellectual Property Office on Sep. 16, 2013, the entire contents of which are incorporated herein by reference.

BACKGROUND (a) Technical Field

The present application relates to a liquid crystal display.

(b) Description of the Related Art

A liquid crystal display which is one of the most widely used flat panel displays at present, includes two substrates with field generating electrodes such as a pixel electrode and a common electrode, and a liquid crystal layer interposed therebetween.

An amount of transmitted light is controlled by determining an alignment of liquid crystal molecules of the liquid crystal layer through application of voltage to the field generating electrodes to display an image.

The liquid crystal display further includes a switching element connected to each pixel electrode and a plurality of signal lines such as a gate line and a data line for applying voltage to the pixel electrode by controlling the switching element.

Among the liquid crystal displays, a vertically aligned mode liquid crystal display, in which liquid crystal molecules are aligned so that long axes thereof are vertical to the display panels while the electric field is not applied, has been in the limelight because a contrast ratio is large and a reference viewing angle is wide. Herein, the reference viewing angle means a viewing angle at which the contrast ratio is 1:10 or a luminance inversion limit angle between gradations.

A method is presented, in which in the case of the vertically aligned mode liquid crystal display, in order to make lateral visibility be close to front visibility, one pixel is divided into two subpixels and voltage is differently applied to two subpixels to differentiate transmittance.

However, when one pixel is divided into two subpixels and transmittance of two subpixels are varied to make the lateral visibility be close to the front visibility, luminance increases in a low gradation or a high gradation and it is difficult to express the gradation on the lateral surface, and as a result, image quality deteriorates.

Further, when one pixel is divided into two subpixels, transmittance is decreased by a gap between two subpixels.

Meanwhile, a light blocking member is formed in the liquid crystal display in order to prevent light from being leaked. The light blocking member is formed on a color filter and the light blocking member becomes thick in a part where the color filters overlap with each other.

The above information disclosed in this Background section is only for enhancement of understanding of the background and therefore it may contain information that does not form the prior art that is already known in this country to a person of ordinary skill in the art.

SUMMARY

Embodiments have been made in an effort to prevent a light blocking member from being thick when the light blocking member is formed on a color filter.

An exemplary embodiment provides a liquid crystal display, including: a first substrate; a gate line disposed on the first substrate; a data line disposed on the gate line; and a thin film transistor connected to the gate line and the data line. A plurality of color filters is disposed on the thin film transistor and the data line. A capping layer is disposed on the plurality of color filters. A shielding electrode is disposed on the capping layer. An insulating layer is disposed on the capping layer and includes a first opening extending to a part of the shielding electrode. A light blocking member is disposed on the insulating layer and the shielding electrode. The shielding electrode is disposed in a part corresponding to the data line. Adjacent color filters among the plurality of color filters overlap with each other in the part corresponding to the data line. The first opening is disposed in a part corresponding to the region where the adjacent color filters overlap with each other.

The liquid crystal display may further include a first spacer and a second spacer that are disposed on the light blocking member and have the same thickness. A distance between the first substrate and the top surface of the first spacer may be larger than a distance between the first substrate and the top surface of the second spacer.

The liquid crystal display may further include an etching preventing layer disposed on the same layer as the shielding electrode. The etching preventing layer may be disposed below the second spacer.

The insulating layer may include a second opening extending to the etching preventing layer.

The etching preventing layer and the shielding electrode may be made of the same material.

The liquid crystal display may further include: a first subregion of a first subpixel electrode disposed on the same layer as the shielding electrode, separated from the shielding electrode, and configured to be applied with a first voltage. A second subregion of the first subpixel electrode is disposed on a part of the insulating layer and is connected to the first subregion of the first subpixel electrode. A second subpixel electrode is disposed on a part of the insulating layer, separated from the second subregion of the first subpixel electrode, and is configured to be applied with a second voltage. A second substrate faces the first substrate. A common electrode is disposed on the second substrate and is configured to be applied with common voltage, in which a difference between the first voltage and the common voltage may be larger than a difference between the second voltage and the common voltage.

The first subregion of the first subpixel electrode and the shielding electrode may be made of the same material.

The first subregion of the first subpixel electrode and the second subregion of the first subpixel electrode may be connected to each other through a contact hole formed in the insulating layer.

The liquid crystal display may further include: a first region where the second subregion of the first subpixel electrode is positioned; a second region in which a first part of the first subregion of the first subpixel electrode and a first part of the second subpixel electrode overlap with each other with the insulating layer interposed therebetween; and a third region in which a second part of the second subpixel electrode is positioned.

The second subregion of the first subpixel electrode may include a cross-shaped stem portion at the center thereof and a plurality of first branch electrodes that extends from the cross-shaped stem portion.

The plurality of first branch electrodes may extend in four different directions.

The first part of the second subpixel electrode and the second part of the second subpixel electrode may include a plurality of second branch electrodes that extends in different directions.

The second subregion of the first subpixel electrode may have an overall shape of a lozenge.

According to an exemplary embodiment, the thickness of a light blocking member in a part where color filters overlap with each other can be decreased by removing an insulating layer in the part where the color filters overlap with each other. As a result, it is possible to prevent the light blocking member from contacting a second display panel.

Further, an opening is formed below one spacer between two same spacers to differentiate lengths between a substrate and top surfaces of two spacers. That is, since two spacers need not have different lengths, two spacers can be formed by a simple process.

DETAILED DESCRIPTION OF THE EMBODIMENTS

Figure 1:
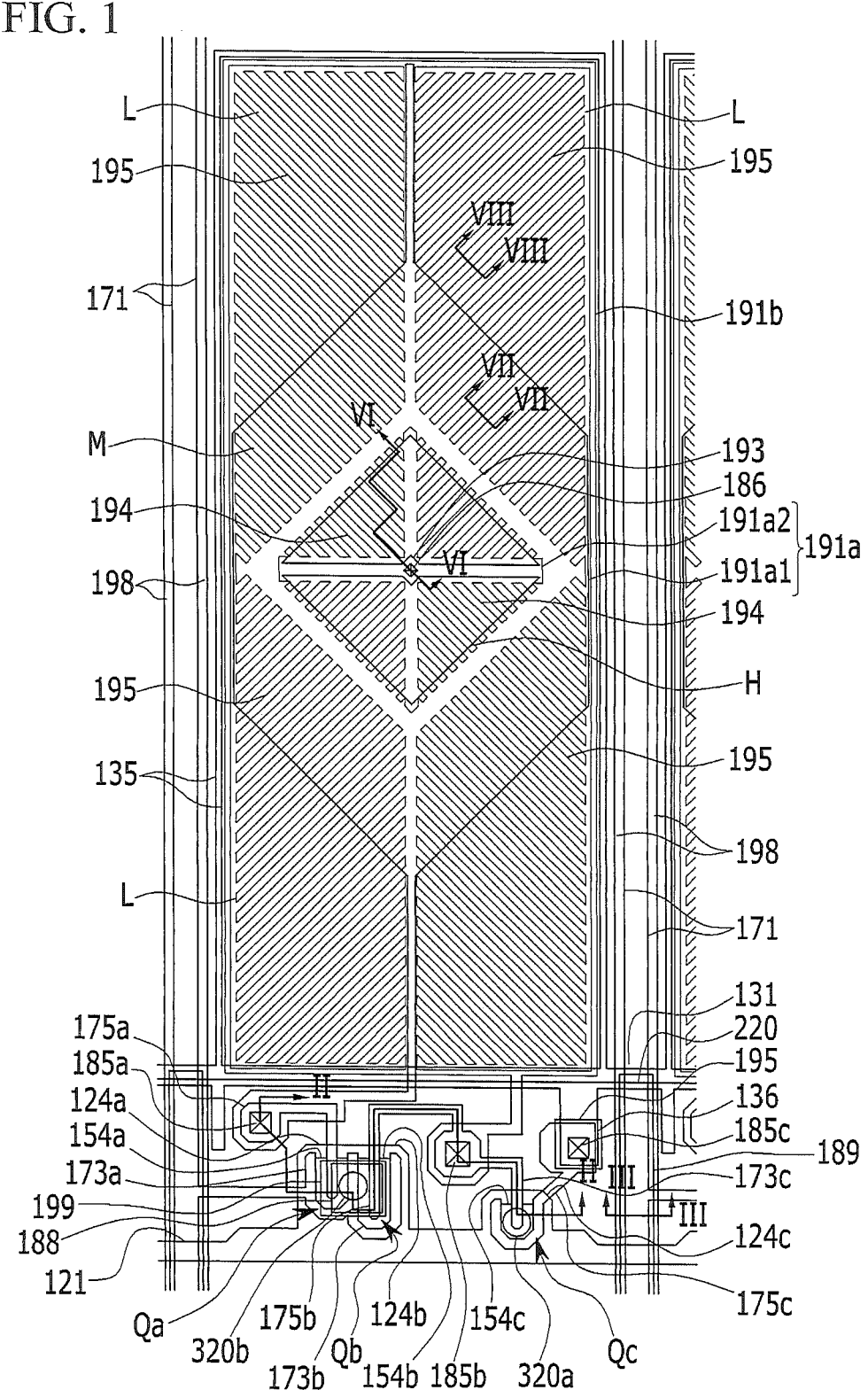
FIG. 1 is a layout view illustrating a liquid crystal display according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

The drawings and description are to be regarded as illustrative in nature and not restrictive, and like reference numerals designate like elements throughout the specification.

In addition, the size and thickness of each configuration shown in the drawings are arbitrarily shown for understanding and ease of description, but the inventive concept is not limited thereto.

In the drawings, the thickness of layers, films, panels, regions, etc., are exaggerated for clarity. In the drawings, for understanding and ease of description, the thickness of some layers and areas is exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising", will be understood to imply the inclusion of stated elements but not the exclusion of any other elements. Further, in the specification, the word "on" means positioning on or below the object portion, but does not essentially mean positioning on the upper side of the object portion based on a gravity direction.

Hereinafter, a liquid crystal display according to an exemplary embodiment will be described with reference to FIGS. 1 to 8.

Figure 2:
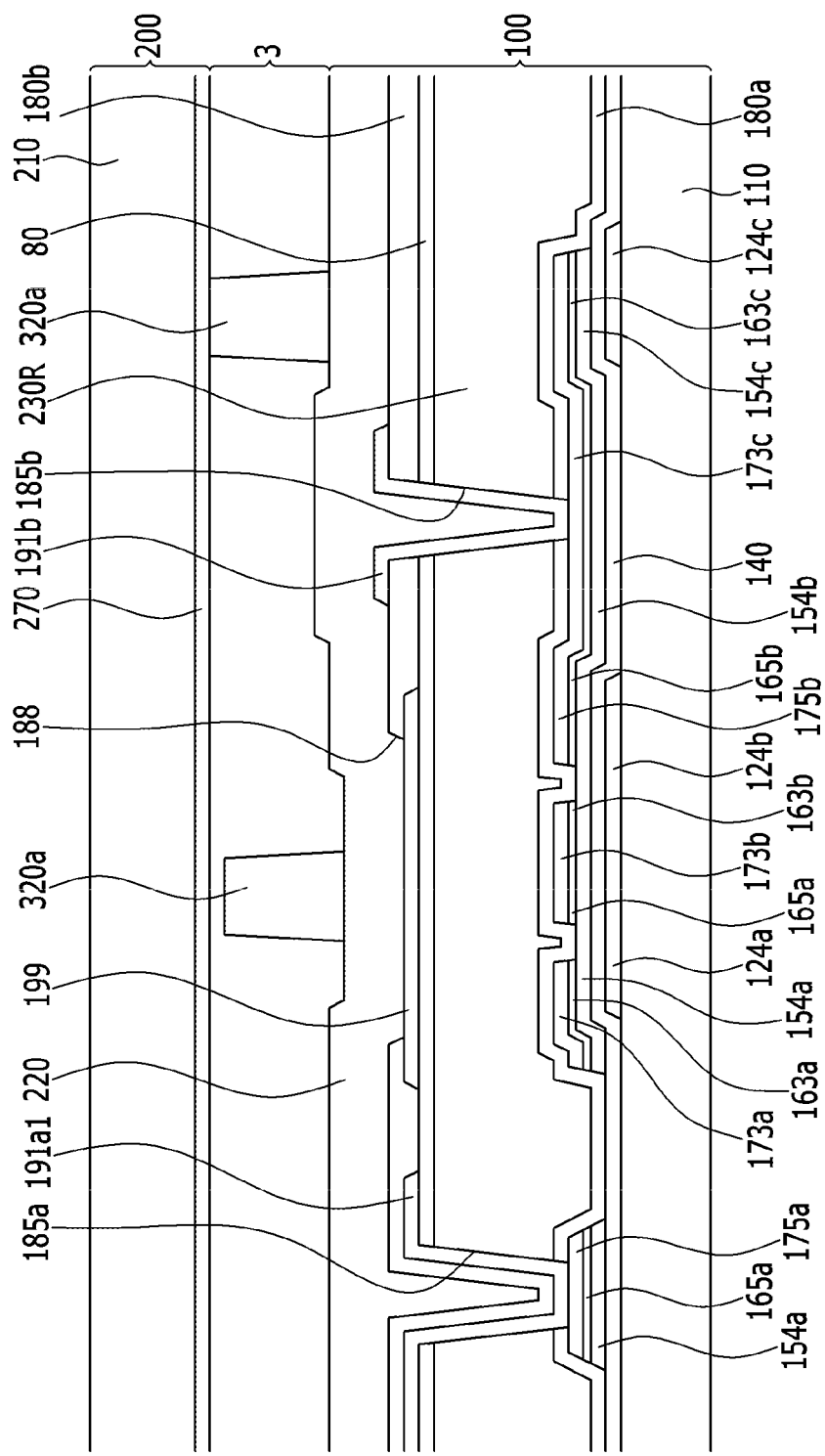
FIG. 2 is a cross-sectional view of the liquid crystal display of FIG. 1 taken along line II-II.
Figure 3:
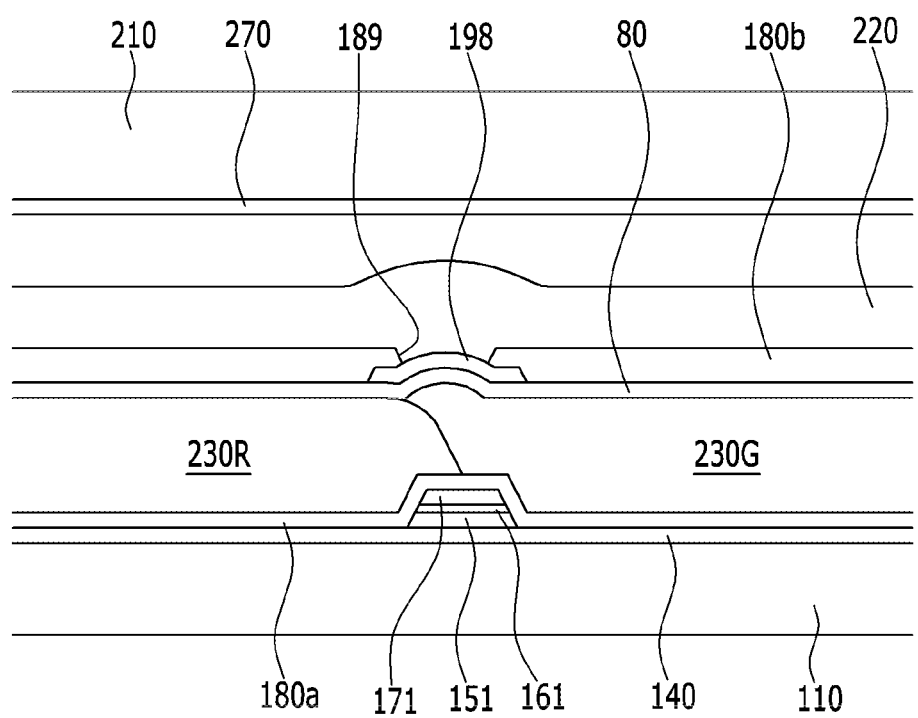
FIG. 3 is a cross-sectional view of the liquid crystal display of FIG. 1 taken along line III-III.
Figure 4:
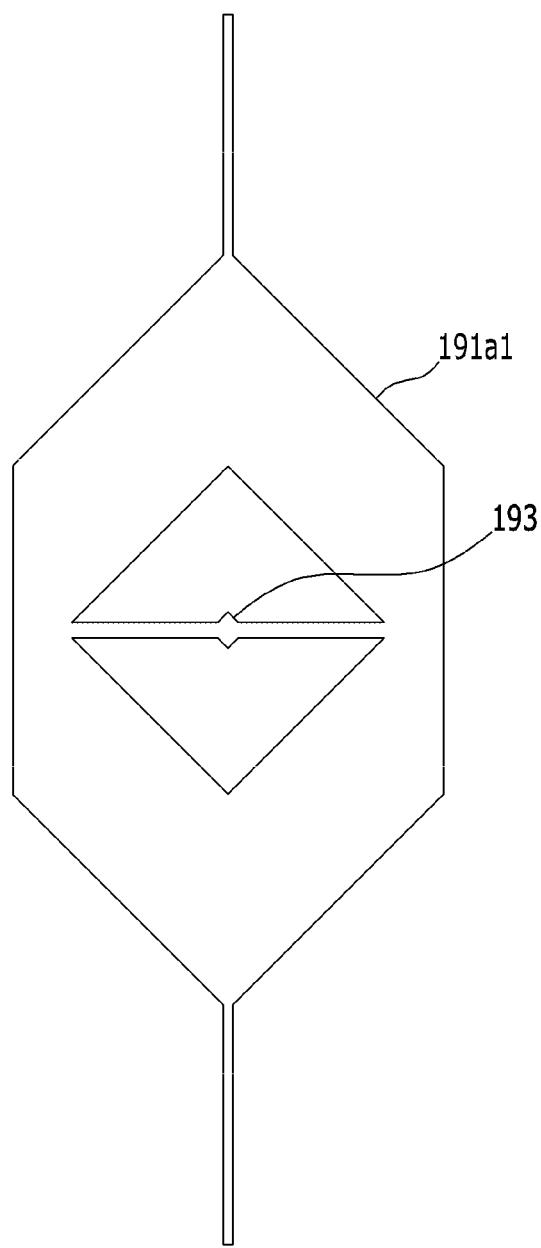
FIG. 4 is a layout view of a first subpixel electrode of the liquid crystal display of FIG. 1.
Figure 5:
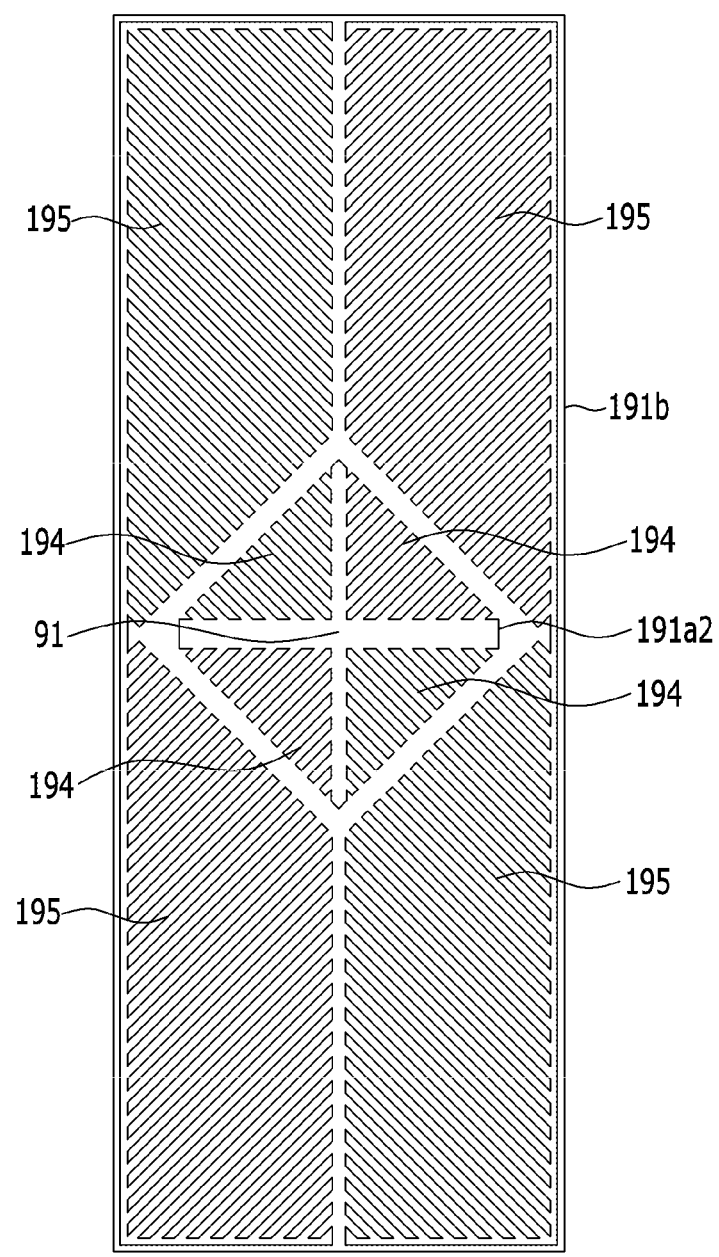
FIG. 5 is a layout view of a part of the first subpixel electrode and a second subpixel electrode of the liquid crystal display of FIG. 1.
Figure 6:
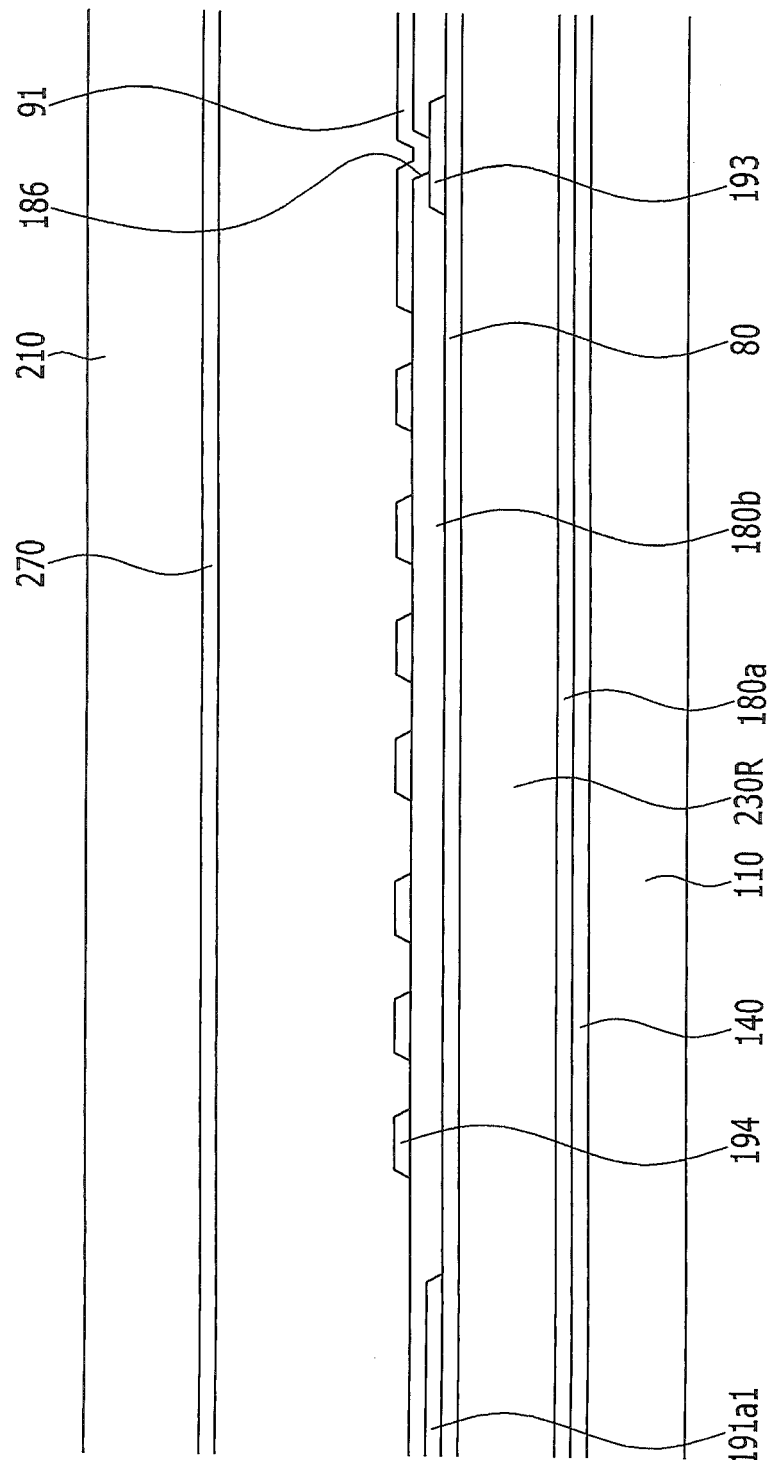
FIG. 6 is a cross-sectional view of the liquid crystal display of FIG. 1 taken along line VI-VI.
Figure 7:
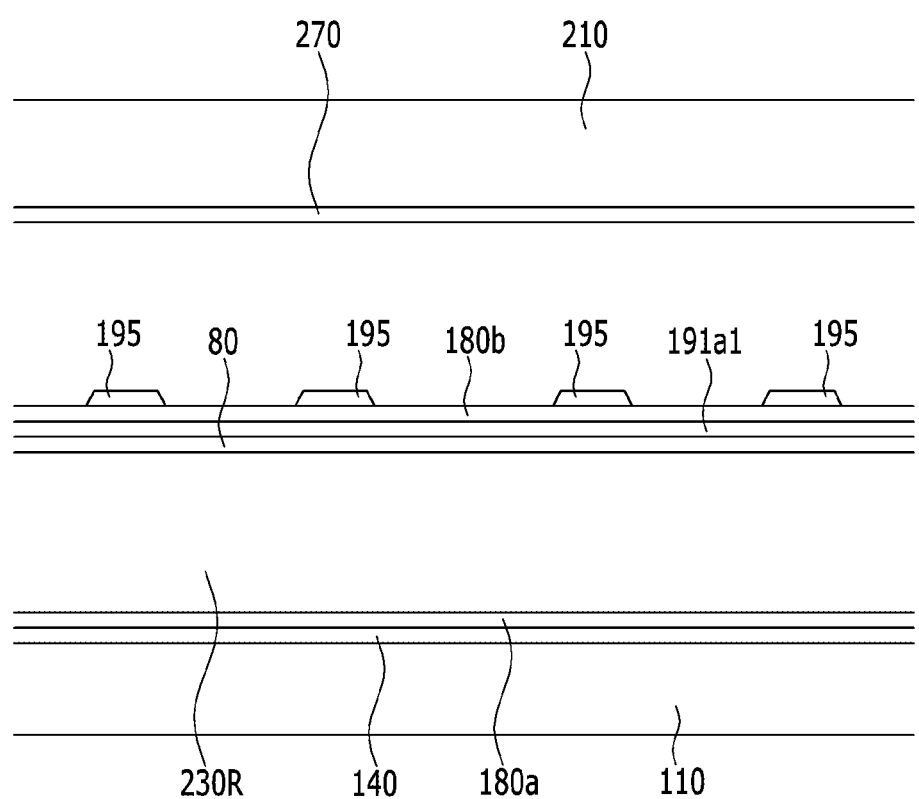
FIG. 7 is a cross-sectional view of the liquid crystal display of FIG. 1 taken along line VII-VII.
Figure 8:
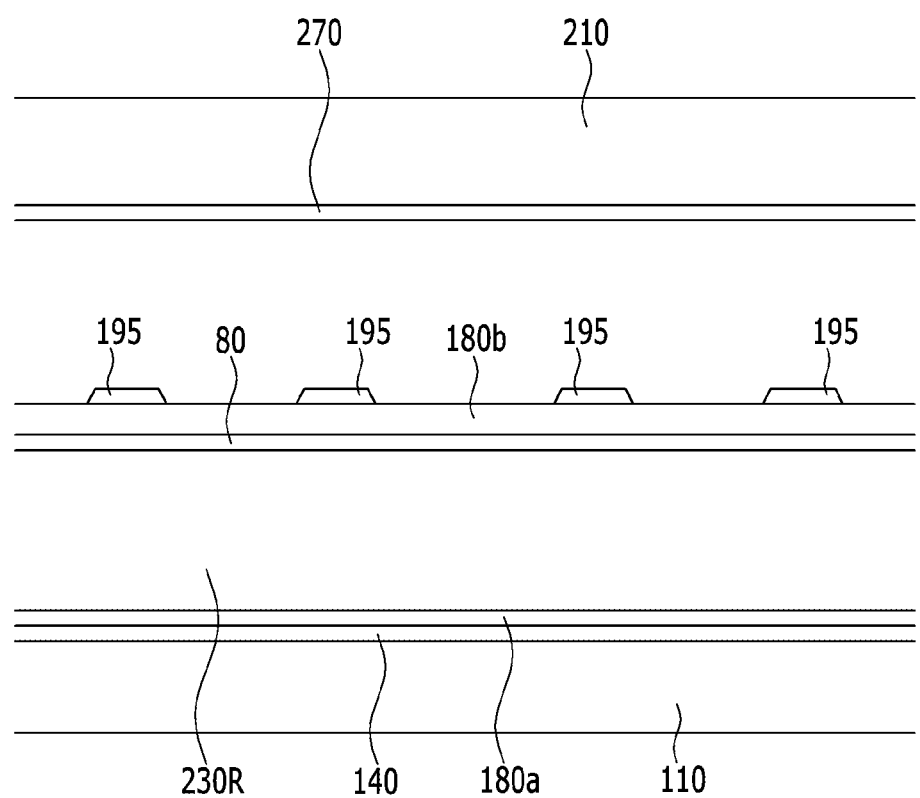
FIG. 8 is a cross-sectional view of the liquid crystal display of FIG. 1 taken along line VIII-VIII.

FIG. 1 is a layout view illustrating a liquid crystal display according to an exemplary embodiment. FIG. 2 is a cross-sectional view of the liquid crystal display of FIG. 1 taken along line II-II. FIG. 3 is a cross-sectional view of the liquid crystal display of FIG. 1 taken along line III-III. FIG. 4 is a layout view of a first subpixel electrode of the liquid crystal display of FIG. 1. FIG. 5 is a layout view of a part of the first subpixel electrode and a second subpixel electrode of the liquid crystal display of FIG. 1. FIG. 6 is a cross-sectional view of the liquid crystal display of FIG. 1 taken along line VI-VI. FIG. 7 is a cross-sectional view of the liquid crystal display of FIG. 1 taken along line VII-VII. FIG. 8 is a cross-sectional view of the liquid crystal display of FIG. 1 taken along line VIII-VIII.

Referring to FIGS. 1 to 3, the liquid crystal display according to the exemplary embodiment includes a first display panel 100 and a second display panel 200 facing each other, and a liquid crystal layer 3 interposed between the first display panel 100 and the second display panel 200.

First, the first display panel 100 will be described.

A gate line 121, a reference voltage line 131, and a first storage electrode 135 are disposed on a first substrate 110 which is made of transparent glass or plastic.

The gate line 121 extends mainly in a horizontal direction and transfers a gate signal. The gate line 121 includes a first gate electrode 124a, a second gate electrode 124b, a third gate electrode 124c, and a wide end portion.

The reference voltage line 131 may be extended in parallel to the gate line 121 and has an extension part 136, and the extension part 136 is connected with a third drain electrode 175c to be described below. The reference voltage line 131 includes the first storage electrode 135 that surrounds a pixel region.

A gate insulating layer 140 is formed on the gate line 121, the reference voltage line 131, and the first storage electrode 135.

A linear semiconductor 151, a first semiconductor 154a, a second semiconductor 154b, and a third semiconductor 154c which are made of amorphous or crystalline silicon are disposed on the gate insulating layer 140.

A linear ohmic contact member 161 is disposed on the linear semiconductor 151, and a plurality of island-type ohmic contact members 163a, 163b, 163c, 165a, 165b, and 165c is disposed on the first semiconductor 154a, the second semiconductor 154b, and the third semiconductor 154c.

Data conductors 171, 173a, 173b, 173c, 175a, 175b, and 175c include a data line 171 including a first source electrode 173a and a second source electrode 173b and a first drain electrode 175a, a second drain electrode 175b, a third source electrode 173c, and the third drain electrode 175c. The Data conductors 171, 173a, 173b 173c, 175a, 175b, and 175c are disposed on the linear ohmic contact member 161 and the island-type ohmic contact members 163a, 163b, 163c, 165a, 165b, and 165c, and the gate insulating layer 140. The data line 171 transfers a data signal and mainly extends in a vertical direction to cross the gate line 121. The second drain electrode 175b is connected with the third source electrode 173c. The linear ohmic contact member 161 and the linear semiconductor 151 are positioned below the data line 171.

The first gate electrode 124a, the first source electrode 173a, and the first drain electrode 175a form a first thin film transistor Qa together with the first semiconductor 154a. A channel of the first thin film transistor Qa is formed in the first semiconductor 154a between the first source electrode 173a and the first drain electrode 175a. Similarly as above, the second gate electrode 124b, the second source electrode 173b, and the second drain electrode 175b form a second thin film transistor Qb together with the second semiconductor 154b. A channel of the second thin film transistor Qb is formed in the second semiconductor 154b between the second source electrode 173b and the second drain electrode 175b. Further, the third gate electrode 124c, the third source electrode 173c, and the third drain electrode 175c form a third thin film transistor Qc together with the third semiconductor 154c. A channel of the third thin film transistor Qc is formed in the third semiconductor 154c between the third source electrode 173c and the third drain electrode 175c.

A first passivation layer 180a which may be made of an inorganic insulator such as silicon nitride or silicon oxide is disposed on the data conductors 171, 173a, 173b, 173c, 175a, 175b, 175c and the exposed portions of the semiconductors 154a, 154b, and 154c.

A red color filter 230R, a green color filter 230G, and a blue color filter 230B are positioned on the first passivation layer 180a. Two color filters which are adjacent to each other, for example, the red color filter 230R and the green color filter 230G overlap with each other in a part corresponding to the data line 171. In the part where two adjacent color filters overlap with each other, the thicknesses of the color filters are larger than the thicknesses of the respective red, green, and blue color filters 230R, 230G, and 230B.

A capping layer 80 is positioned on the red, green, and blue color filters 230R, 230G, and 230B. The capping layer 80 prevents the red, green, and blue color filters 230R, 230G, and 230B from being lifted, and suppresses contamination of the liquid crystal layer 3 by an organic material such as a solvent that flows from the red, green, and blue color filters 230R, 230G, and 230B, thereby preventing a defect such as an afterimage which may be caused when a screen is driven.

A first subregion 191a1 of the first subpixel electrode 191a, a shielding electrode 198, and an etching preventing layer 199 are disposed on the capping layer 80. The first subregion 191a1 of the first subpixel electrode 191a, the shielding electrode 198, and the etching preventing layer 199 are made of the same material.

The shielding electrode 198 is disposed in the part corresponding to the data line 171 and the same voltage as voltage applied to a common electrode 270 disposed on the second display panel 200 is applied to the shielding electrode 198. As a result, it is possible to prevent the data line 171 from influencing liquid crystal molecules of the liquid crystal layer 3. Further, since the same voltage as the voltage applied to the common electrode 270 is applied to the shielding electrode 198, an electric field is not formed between the shielding electrode 198 and the common electrode 270.

Referring to FIG. 4, the first subregion 191a1 of the first subpixel electrode 191a has a plane shape including a horizontal connection portion positioned at the center of a pixel region and four parallelograms positioned around the horizontal connection portion and surrounding the horizontal connection portion. An extension part 193 is positioned at the center of the horizontal connection portion. Further, the first subregion 191a1 has a projection portion that extends vertically along a vertical center of the pixel region. Like this, the first subregion 191a1 of the first subpixel electrode 191a is positioned in a part of the pixel region.

A second passivation layer 180b is disposed on the capping layer 80 and the first subregion 191a1 of the first subpixel electrode 191a.

A first opening 188 that extends to and exposes a part of the shielding electrode 198 and a second opening 189 that extends to and exposes the etching preventing layer 199 are formed in the second passivation layer 180b. The first opening 188 and the second opening 189 are formed by etching, and the shielding electrode 198 and the etching preventing layer 199 are overetched to prevent the capping layer 80 from being etched when the first opening 188 and the second opening 189 are formed.

A second subregion 191a2 of the first subpixel electrode 191a and a second subpixel electrode 191b are disposed on the second passivation layer 180b. A part of the second subpixel electrode 191b overlaps with the first subregion 191a1 of the first subpixel electrode 191a.

Referring to FIG. 5, the second subregion 191a2 of the first subpixel electrode 191a and the second subpixel electrode 191b are separated from each other.

The second subregion 191a2 of the first subpixel electrode 191a is positioned at the center of a pixel and has an overall shape of a lozenge. The second subregion 191a2 of the first subpixel electrode 191a includes a cross-shaped stem portion 91 at the center thereof and a plurality of first branch electrodes 194 that extends from the cross-shaped stem portion 91. The plurality of first branch electrodes 194 extends in four different directions.

The second subpixel electrode 191b includes an outer stem portion formed to surround an outer perimeter of the pixel region and a plurality of second branch electrodes 195 that extends from the outer stem portion. The plurality of second branch electrodes 195 extends in four different directions.

A first contact hole 185a that exposes a part of the first drain electrode 175a is formed in the first passivation layer 180a, the red color filter 230R, and the capping layer 80. A second contact hole 185b that exposes a part of the second drain electrode 175b is formed in the first passivation layer 180a, the red color filter 230R, the capping layer 80, and the second passivation layer 180b. Further, a third contact hole 186 that exposes the center of the first subregion 191a1 of the first subpixel electrode 191a is formed in the second passivation layer 180b. Further, a fourth contact hole 185c that exposes a part of the extension part 136 of the reference voltage line 131 is formed in the first passivation layer 180a and the red color filter 230R.

The first subregion 191a1 of the first subpixel electrode 191a is physically and electrically connected to the first drain electrode 175a through the first contact hole 185a. The second subpixel electrode 191b is physically and electrically connected with the second drain electrode 175b through the second contact hole 185b. The first subpixel electrode 191a and the second subpixel electrode 191b receive data voltages from the first drain electrode 175a and the second drain electrode 175b through the first contact hole 185a and the second contact hole 185b, respectively.

Further, the second subregion 191a2 of the first subpixel electrode 191a is connected with the extension part 193 of the first subregion 191a1 of the first subpixel electrode 191a through the third contact hole 186 formed in the second passivation layer 180b. Further, the extension part 136 of the reference voltage line 131 is connected with the third drain electrode 175c through the fourth contact hole 185c.

A light blocking member 220 is disposed on the second passivation layer 180b, the exposed shielding electrode 198, and the exposed etching preventing layer 199. The light blocking member 220 is called a black matrix and blocks light leakage. The light blocking member 220 is disposed outside the pixel region. As a result, the light blocking member 220 does not overlap with the first subregion 191a1 of the first subpixel electrode 191a positioned in the pixel region, the second subregion 191a2 of the first subpixel electrode 191a, and the second subpixel electrode 191b.

Meanwhile, the shielding electrode 198 is disposed in the part corresponding to the data line 171, and two color filters that are adjacent to each other, for example, the red color filter 230R and the green color filter 230G overlap with each other in the part corresponding to the data line 171. Due to such a reason, the part where the shielding electrode 198 is disposed is thicker than other parts, that is, parts where the respective color filters 230R, 230G, and 230B which do not overlap with each other, are disposed. As a result, the light blocking member 220 disposed on the shielding electrode 198 may contact the second display panel 200.

However, in the exemplary embodiment, since the shielding electrode 198 is exposed by the first opening 188 of the second passivation layer 180b, the height of the light blocking member 220 disposed on the shielding electrode 198 decreases as thick as the second passivation layer 180b. Therefore, the light blocking member 220 may be prevented from contacting the second display panel 200.

A first spacer 320a and a second spacer 320b are disposed on the light blocking member 220. The first spacer 320a, the second spacer 320b, and the light blocking member 220 are made of the same material.

The lengths of the first spacer 320a and the second spacer 320b are substantially the same as each other. However, since the second spacer 320b is disposed in a part corresponding to the exposed shielding electrode 198, a distance between the first substrate 110 and the top surfaces of the second spacer 320b is smaller than a distance between the first substrate 110 and the top surfaces of the first spacer 320a. Therefore, the first spacer 320a contacts the second display panel 200 and the second spacer 320b is spaced apart from the second display panel 200.

The first spacer 320a contacts the second display panel 200 and serves to constantly maintain a distance between the first display panel 100 and the second display panel 200. Further, since the first spacer 320a has elasticity, the first spacer 320a may be compressed by external force and thereafter, recovered to an original state again.

The second spacer 320b is spaced apart from the second display panel 200, and when external force of a predetermined value or more is applied to the first spacer 320a, the second spacer 320b distributes the external force as the second spacer 320b contact the second display panel 200. Therefore, it is possible to prevent the second spacer 320b from being damaged by the external force.

Since materials of the first spacer 320a and the second spacer 320b are the same as a material of the light blocking member 220, and the lengths of the first spacer 320a and the second spacer 320b are substantially the same as each other, a half ton mask may be formed by a simple manufacturing process when the first spacer 320a and the second spacer 320b are formed. For example, when a positive sensitizer including a black pigment is applied, and exposed, a light blocking part of a photomask is disposed in parts to become the first spacer 320a and the second spacer 320b. A slit part of the photomask is disposed in a part to become the light blocking member 220, and a transport part of the photomask is disposed in a remaining part where the light blocking member 220 is not formed and exposed. As a result, the first spacer 320a, the second spacer 320b, and the light blocking member 220 may be formed by one mask.

Hereinafter, the second display panel 200 will be described.

The light blocking member 220 and the common electrode 270 are formed on the second substrate 210 made of transparent glass or plastic.

Alignment layers (not illustrated) may he formed on inner sides of the first and second display panels 100 and 200, and may be vertical alignment layers.

Polarizers (not illustrated) are provided on outer surfaces of the first and second display panels 100 and 200. Transmission axes of two polarizers are perpendicular to each other and one transmission axis therebetween may be parallel to the gate line 121. However, the polarizer may be disposed only on the outer surface of any one of the first and second display panels 100 and 200.

The liquid crystal layer 3 has negative dielectric anisotropy, and the liquid crystal molecules of the liquid crystal layer 3 are aligned so that long axes thereof are vertical to the surfaces of the first and second display panels 100 and 200 without applying an electric field. Accordingly, incident light does not pass through an orthogonal polarizer but is blocked while the electric field is not applied.

Further, as described above, since the same voltage as the voltage applied to the common electrode 270 is applied to the shielding electrode 198, the electric field is not formed between the shielding electrode 198 and the common electrode 270. Therefore, incident light does not pass through the orthogonal polarizer but is blocked in the part where the shielding electrode 198 is formed. That is, the shielding electrode 198 also serves as the light blocking member 220.

At least one of the liquid crystal layer 3 and the alignment layer may include a photo-reactive material, in more detail, reactive mesogen.

Then, a driving method of the liquid crystal display according to the exemplary embodiment will be described in brief.

When a gate-on signal is applied to a gate line 121, the gate-on signal is applied to a first gate electrode 124a, a second gate electrode 124b, and a third gate electrode 124c. As a result, a first switching element Qa, a second switching element Qb, and a third switching element Qc are turned on. As a result, data voltage applied to a data line 171 is applied to a first subpixel electrode 191a and a second subpixel electrode 191b through the turned-on first switching element Qa and second switching element Qb, respectively.

In this case, voltage of the same intensity is applied to the first subpixel electrode 191a and the second subpixel electrode 191b. However, the voltage applied to the second subpixel electrode 191b is divided through the third switching element Qc connected with the second switching element Qb in series. Accordingly, the voltage applied to the second subpixel electrode 191b is lower than the voltage applied to the first subpixel electrode 191a.

In the exemplary embodiment, the liquid crystal display includes the third switching element Qc connected with the second switching element Qb in series, but the embodiments are not limited thereto and may be applied to all other cases in which the voltage applied to the first subpixel electrode 191a is higher than the voltage applied to the second subpixel electrode 191b.

Referring back to FIG. 1, one pixel region of the liquid crystal display according to the exemplary embodiment includes a first region H positioned in a second subregion 191a2 of the first subpixel electrode 191a, a second region M where a part of the first subregion 191a1 of the first subpixel electrode 191a and a part of a second subpixel electrode 191b are positioned, and a third region L where a part of the second subpixel electrode 191b is positioned.

Each of the first region H, the second region M, and the third region L is constituted by four regions according to directions in which first branch electrodes 194 or second branch electrodes 195 extend.

Then, referring to FIGS. 6 to 8, the first region H, the second region M, and the third region L included in one pixel region of the liquid crystal display according to the exemplary embodiment will be described.

Referring to FIG. 6, in the first region H of one pixel region of the liquid crystal display according to the exemplary embodiment, an extension part 193 of the first subregion 191a1 of the first subpixel electrode 191a and a cross-shaped stem portion 91 of a second subregion 191a2 of the first subpixel electrode 191a are connected to each other through a contact hole 186 to receive voltage of the same intensity. Therefore, the second subregion 191a2 of the first subpixel electrode 191a and a common electrode 270 positioned on a second display panel 200 generate an electric field.

In this case, by a fringe field created by edges of a plurality of first branch electrodes 194, liquid crystal molecules of a liquid crystal layer 3 positioned in the first region H are inclined in four different directions. In more detail, since a horizontal component of the fringe field by the plurality of first branch electrodes 194 is substantially horizontal to sides of the plurality of first branch electrodes 194, the liquid crystal molecules are inclined in a direction parallel to a longitudinal direction of the plurality of first branch electrodes 194.

Referring to FIG. 7, in the second region M of one pixel region of the liquid crystal display according to the exemplary embodiment, a part of the first subregion 191a1 of the first subpixel electrode 191a positioned on a first display panel 100 and parts of a plurality of second branch electrodes 195 of the second subpixel electrode 191b overlap with each other with a second passivation layer 180b interposed therebetween.

Accordingly, the liquid crystal molecules of the liquid crystal layer 3 are arranged by the electric field formed between the plurality of second branch electrodes 195 of the second subpixel electrode 191b and the common electrode 270 of the second display panel 200, the electric field formed between the first subregion 191a1 of the first subpixel electrode 191a positioned among the plurality of second branch electrodes 195 of the second subpixel electrode 191b and the common electrode 270, and the electric field formed between the plurality of second branch electrodes 195 of the second subpixel electrode 191b and the first subregion 191a1 of the first subpixel electrode 191a.

In this case, by a fringe field created by edges of the plurality of second branch electrodes 195, liquid crystal molecules of the liquid crystal layer 3 positioned in the second region 114 are inclined in four different directions. In more detail, since a horizontal component of the fringe field by the plurality of second branch electrodes 195 is substantially horizontal to sides of the plurality of second branch electrodes 195, the liquid crystal molecules are inclined in a direction parallel to a longitudinal direction of the plurality of second branch electrodes 195.

As described above, the voltage applied to the second subpixel electrode 191b is lower than the voltage applied to the first subpixel electrode 191a. Accordingly, the intensity of the electric field formed in the second region M is relatively lower than the intensity of the electric field formed in the first region H where the first subpixel electrode 191a to which relatively high voltage is applied is positioned.

Next, referring to FIG. 8, in the third region L of one pixel region of the liquid crystal display according to the exemplary embodiment, the electric field is created together with the plurality of second branch electrodes 195 of the second subpixel electrode 191b positioned on the first display panel 100 and the common electrode 270 positioned on the second display panel 200.

In this case, by the fringe field created by the edges of the plurality of second branch electrodes 195, liquid crystal molecules of the liquid crystal layer 3 positioned in the second region M are inclined in four different directions. In more detail, since a horizontal component of the fringe field by the plurality of second branch electrodes 195 is substantially horizontal to sides of the plurality of second branch electrodes 195, the liquid crystal molecules are inclined in a direction parallel to a longitudinal direction of the plurality of second branch electrodes 195.

As described above, second voltage applied to the second subpixel electrode 191b is lower than first voltage applied to the first subpixel electrode 191a.

Accordingly, the intensity of the electric field applied to the liquid crystal layer positioned in the first region H is highest and the intensity of the electric field applied to the liquid crystal layer positioned in the third region L is lowest. Since the electric field of the first subpixel electrode 191a positioned below the second subpixel electrode 191b influences the second region M, the intensity of the electric field applied to the liquid crystal layer positioned in the second region M is lower than that of the electric field applied to the liquid crystal layer positioned in the first region H, and higher than that of the electric field is applied to the liquid crystal layer positioned in the third region L.

As described above, in the liquid crystal display according to the exemplary embodiment, one pixel region is divided into a first region, a second region, and a third region. In the first region, the first subpixel electrode 191a applied with relatively high first voltage is positioned. In the second region, a part of the first subpixel electrode 191a and a part of the second subpixel electrode 191b applied with relatively low second voltage overlap with each other with an insulating layer interposed therebetween. In the third region, the second subpixel electrode 191b applied with the relatively low second voltage is positioned.

Accordingly, the intensities of the electric fields applied to the liquid crystal molecules corresponding to the first region, the second region, and the third region are different from each other. Angles at which the liquid crystal molecules are inclined are thus different from each other. As a result, luminance of each region varies.

As such, when one pixel region is divided into three regions having different luminance, a change of transmittance depending on a gradation is slantly controlled to prevent transmittance from being rapidly changed depending on a change of a gradation even at a low gradation and a high gradation on a lateral surface. As a result, the gradation can be accurately expressed even at the low gradation and the high gradation while lateral visibility is close to front visibility.

While embodiments have been described in connection with what is presently considered to be practical exemplary embodiments, it is to be understood that the embodiments is not limited to the disclosed embodiments, but, on the contrary, is intended to cover various modifications and equivalent arrangements included within the spirit and scope of the appended claims.

What is claimed is:

1. A liquid crystal display, comprising:
a first substrate;
a gate line disposed on the first substrate;
a data line disposed on the gate line;

a thin film transistor connected to the gate line and the data line;
a plurality of color filters disposed on the thin film transistor and the data line;
a capping layer disposed on the plurality of color filters;
a shielding electrode disposed on the capping layer;
an insulating layer disposed on the capping layer and including a first opening that extends to a part of the shielding electrode; and
a light blocking member disposed on the insulating layer and the shielding electrode,
wherein the shielding electrode is disposed in a part corresponding to the data line,
adjacent color filters among the plurality of color filters overlap with each other in the part corresponding to the data line, and
the first opening is disposed in a part corresponding to the region where the adjacent color filters overlap with each other.

2. The liquid crystal display of claim 1, further comprising a first spacer and a second spacer that are disposed on the light blocking member and have the same thickness,
wherein a distance between the first substrate and the top surface of the first spacer is larger than a distance between the first substrate and the top surface of the second spacer.

3. The liquid crystal display of claim 2, further comprising an etching preventing layer disposed on the same layer as the shielding electrode,
wherein the etching preventing layer is disposed below the second spacer.

4. The liquid crystal display of claim 3, wherein the insulating layer includes a second opening extending to the etching preventing layer.

5. The liquid crystal display of claim 4, wherein the etching preventing layer and the shielding electrode are made of the same material.

6. The liquid crystal display of claim 5, further comprising:
a first subregion of a first subpixel electrode disposed on the same layer as the shielding electrode, separated from the shielding electrode, and configured to be applied with a first voltage;
a second subregion of the first subpixel electrode disposed on a part of the insulating layer and connected to the first subregion of the first subpixel electrode;
a second subpixel electrode disposed on a part of the insulating layer, separated from the second subregion of the first subpixel electrode, and configured to be applied with a second voltage;
a second substrate facing the first substrate; and
a common electrode disposed on the second substrate and configured to be applied with a common voltage,
wherein a difference between the first voltage and the common voltage is larger than a difference between the second voltage and the common voltage.

7. The liquid crystal display of claim 6, wherein the first subregion of the first subpixel electrode and the shielding electrode are made of the same material.

8. The liquid crystal display of claim 7, wherein the first subregion of the first subpixel electrode and the second subregion of the first subpixel electrode are connected to each other through a contact hole formed in the insulating layer.

9. The liquid crystal display of claim 8, further comprising:
a first region where the second subregion of the first subpixel electrode is positioned;
a second region in which a first part of the first subregion of the first subpixel electrode and a first part of the second subpixel electrode overlap with each other with the insulating layer interposed therebetween; and
a third region in which a second part of the second subpixel electrode is positioned.

10. The liquid crystal display of claim 9, wherein the second subregion of the first subpixel electrode includes a cross-shaped stem portion at the center thereof and a plurality of first branch electrodes that extends from the cross-shaped stem portion.

11. The liquid crystal display of claim 10, wherein the plurality of first branch electrodes extends in four different directions.

12. The liquid crystal display of claim 11, wherein the first part of the second subpixel electrode and the second part of the second subpixel electrode include a plurality of second branch electrodes that extends in different directions.

13. The liquid crystal display of claim 12, wherein the second subregion of the first subpixel electrode has an overall shape of a lozenge.

14. The liquid crystal display of claim 1, further comprising:
a first subregion of a first subpixel electrode disposed on the same layer as the shielding electrode, separated from the shielding electrode, and configured to be applied with a first voltage;
a second subregion of the first subpixel electrode disposed on a part of the insulating layer and connected with the first subregion of the first subpixel electrode;
a second subpixel electrode disposed on a part of the insulating layer, separated from the second subregion of the first subpixel electrode, and configured to be applied with a second voltage;
a second substrate facing the first substrate; and
a common electrode positioned on the second substrate and configured to be applied with a common voltage,
wherein the difference between the first voltage and the common voltage is larger than the difference between the second voltage and the common voltage.

15. The liquid crystal display of claim 14, wherein the first subregion of the first subpixel electrode and the shielding electrode are made of the same material.

16. The liquid crystal display of claim 15, further comprising:
a first region where the second subregion of the first subpixel electrode is positioned;
a second region in which a first part of the first subregion of the first subpixel electrode and a first part of the second subpixel electrode overlap with each other with the insulating layer interposed therebetween; and
a third region in which a second part of the second subpixel electrode is positioned.

17. The liquid crystal display of claim 16, wherein the second subregion of the first subpixel electrode includes a cross-shaped stem portion at the center thereof and a plurality of first branch electrodes that extends from the cross-shaped stem portion.

18. The liquid crystal display of claim 17, wherein the plurality of first branch electrodes extends in four different directions.

19. The liquid crystal display of claim 18, wherein the first part of the second subpixel electrode and the second part of the second subpixel electrode include a plurality of second branch electrodes that extend in different directions.

20. The liquid crystal display of claim 19, wherein the second subregion of the first subpixel electrode has an overall shape of a lozenge.

* * * * *